United States Patent Office 3,661,919
Patented May 9, 1972

3,661,919
TETRAHYDROPYRIDYL-5-RESORCINOLS
Raj K. Razdan, Belmont, Mass., William R. Thompson, Ithaca, N.Y., and Felix E. Granchelli, Arlington, and Harry G. Pars, Lexington, Mass., assignors to Arthur D. Little, Inc., Cambridge, Mass.
No Drawing. Filed Mar. 27, 1969, Ser. No. 811,701
Int. Cl. C07d 29/38
U.S. Cl. 260—297 R    5 Claims

ABSTRACT OF THE DISCLOSURE

New 2-$R_2$-5-alkyl-resorcinols having anti-bacterial and anti-fungal activity.

This invention relates to certain 2-$R_2$-5-alkyl-resorcinols and lower-alkanoic acid esters thereof having the formula:

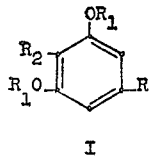

I wherein R is alkyl containing from one to ten carbon atoms; $R_1$ is hydrogen or lower-alkanoyl; and $R_2$ is a member of the group consisting of 1-(2-isopropyl - 5 - lower-alkyl-1-cyclohexenyl) having the formula:

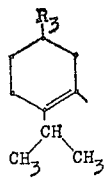

where $R_3$ is lower-alkyl; 3-(1-$R_4$-4-isopropyl-1,2,5,6-tetrahydropyridyl) having the formula:

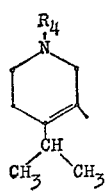

where $R_4$ is hydrogen, lower-alkyl, or phenyl-lower-alkyl; 4-(1-$R_4$-3-isopropyl-1,2,5,6-tetrahydropyridyl) having the formula:

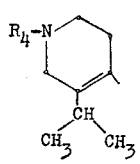

where $R_4$ has the meaning given above; or 3-(2-isopropyl-1,4-ethano-1,4,5,6-tetrahydropyridyl) having the formula:

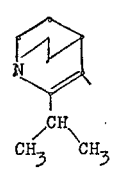

As used herein the term "lower-alkyl" means saturated, monovalent aliphatic radicals, including straight or branched-chain radicals of from one to four carbon atoms, as illustrated by, but not limited to methyl, ethyl, propyl, isopropyl, n-butyl, and the like.

As used herein the term "lower-alkanoyl" means radicals derived from straight or branched-chain lower-alkanoic acids and having from one to four carbon atoms. The term thus is illustrated by, but not limited to, formyl, acetyl, propionyl, isobutyryl, or butyryl.

As used herein the term "alkyl" means saturated, monovalent aliphatic radicals, including straight or branched chain radicals of from one to ten carbon atoms, as illustrated by, but not limited to, methyl, ethyl, n-amyl, 2-heptyl, 3-methyl-2-octyl, 2-decyl, and the like.

The compounds of Formula I were $R_1$ is hydrogen are prepared by reaction, with an alkali metal amide, of a benzopyrano derivative having ethylenic unsaturation at the 3,4-position thereof and having a third carbocyclic or nitrogen-containing heterocyclic ring fused at the said 3,4-positions thereof. More specifically the compounds where $R_2$ is a 1-(2-isopropyl-5-lower-alkyl-1-cyclohexenyl); a 3-(1-$R_4$-4-isopropyl-1,2,5,6-tetrahydropyridyl); a 4-(1-$R_4$-3-isopropyl - 1,2,5,6 - tetrahydropyridyl); or a 3-(2-isopropyl-1,4-ethano - 1,4,5,6 - tetrahydropyridyl) radical are prepared by reaction with an alkali metal amide, respectively, of a 9-$R_3$-3-alkyl-1-hydroxy-6,6-dimethyl-7,8,9,10-tetrahydro-6H-dibenzo[b,d]pyran having the Formula II:

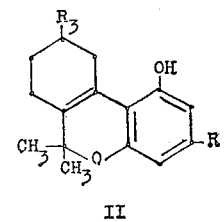

II where R and $R_3$ have the meanings given above; a 2-$R_4$-5,5-dimethyl-10-hydroxy - 8 - alkyl - 1,2,3,4-tetrahydro-5H-[1]benzopyrano[3,4-d]pyridine having the Formula III:

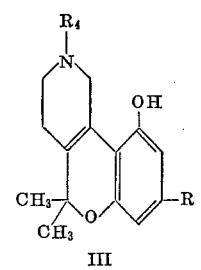

III where R and $R_4$ have the meanings given above; a 3-$R_4$-5,5 - dimethyl - 10 - hydroxy - 8 - alkyl - 1,2,3,4 - tetrahydro-5H-[1]benzopyrano[3,4-c]pyridine having the Formula IV:

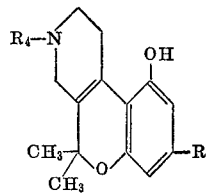

IV where R and $R_4$ have the meanings given above; or a 5,5 - dimethyl - 1,4 - ethano - 10 - hydroxy - 8 - alkyl - 1,2, 3,4-tetrahydro-5H - [1]benzopyrano[3,4 - c]pyridine having the Formula V:

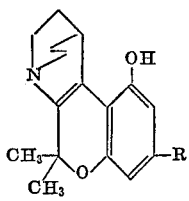

V wherein R has the meaning given above. In each case the reaction is carried out by heating a solution of the benzopyrano derivative, dissolved in a suitable organic solvent inert under the conditions of the reaction, for example, tetrahydrofuran, with an alkali metal amide prepared by dissolving an alkali metal in an excess of liquid ammonia at the boiling point of the mixture. Suitable alkali metals are lithium, sodium, or potassium. It is preferred to use lithium as the alkali metal.

The benzopyrano starting materials of Formulas II, III, IV, and V are generally known or are prepared by methods known in the art. Thus the 9-$R_3$-3-alkyl-1-hydroxy-6,6 - dimethyl - 7,8,9,10 -tetrahydro - 6H - dibenzo[b,d] pyrans of Formula II are described by Adams et al., J. Am. Chem. Soc. 64, 2653 (1942); ibid. 67, 1534 (1945); ibid. 70, 622 (1948); ibid. 70, 664 (1948); the 2-$R_4$-5,5-dimethyl - 10 - hydroxy - 8 - alkyl - 1,2,3,4 - tetrahydro-5H-[1]benzopyrano[3,4-d]pyridines of Formula III are described in Pars et al., U.S. patent application S.N. 490,-687 and Shulgin, U.S. patent application S.N. 490,667, now U.S. Pat. 3,429,889 (both filed Sept. 27 1965); the 3 - $R_4$ - 5,5 - dimethyl - 10 - hydroxy - 8 - alkyl - 1,2,3,4-tetrahydro-5H - [1]benzopyrano[3,4-c]pyridines of Formula IV are described in Pars et al., U.S. patent application S.N. 642,223 (filed May 29, 1967); and the 5,5-dimethyl - 1,4 - ethane - 10 - hydroxy - 8 - alkyl - 1,2,3,4-tetrahydro-5H - [1]benzopyrano[3,4 - c]pyridines of Formula V are described in Lyle et al., U.S. patent application S. N. 642,188 (filed May 29, 1967).

The 9-$R_3$-3-alkyl-1-hydroxy-6,6-dimethyl-7,8,910-tetrahydro-6H-dibenzo[b,d]pyrans of Formula II, the 2-$R_4$-5,5-dimethyl - 10 - hydroxy - 8 - alkyl - 1,2,3,4 - tetrahydro-5H-[1]benzopyrano[3,4-d]pyridines of Formula III; the 3 - $R_4$ - 5,5 - dimethyl - 10 - hydroxy - 8 - alkyl - 1,2,3,4-tetrahydro-5H - [1]benzopyrano[3,4-c]pyridines of Formula IV; and the 5,5-dimethyl-1,4-ethano-10-hydroxy-8-alkyl - 1,234 - tetrahydro - 5H - [1]benzopyrano[3,4-c] pyridines of Formula V are prepared by reacting the respective lactones corresponding to Formulas IIa, IIIa, IVa, and Va:

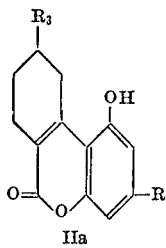
IIa

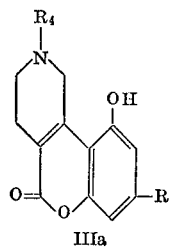
IIIa

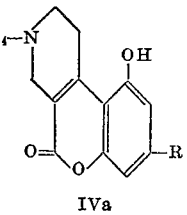
IVa

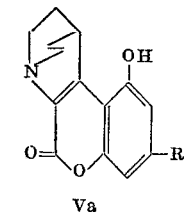
Va where R, $R_3$, and $R_4$ have the meanings given above, with the Grignard reagent prepared from a methyl magnesium halide.

The lactones of Formulas IIa, IIIa, IVa, and Va are in turn prepared by reaction of a 5-alkyl-resorcinol having the Formula VI:

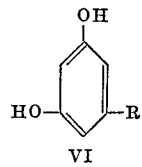

VI where R has the meaning given above in the presence of an acid catalyst with an appropriate cyclic 2-carbo-lower-alkoxyketone having the respective Formulas IIb, IIIb, IVb, and Vb:

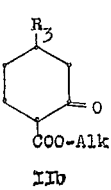
IIb

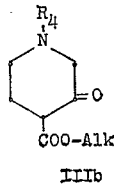
IIIb

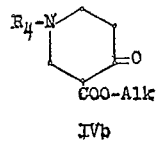
IVb

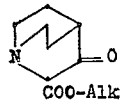
Vb where $R_3$ and $R_4$ have the meanings given above, and Alk is lower alkyl.

The compounds of Formula I where $R_1$ is lower-alkanoyl are prepared by reaction of the corresponding compounds wherein $R_1$ is hydrogen with a lower-alkanoyl halide or a lower-alkanoic acid anhydride. The reaction can be carried out in an organic solvent inert under the conditions of the reaction, for example, benzene, xylene, toluene, chloroform, and the like, and is preferably carried out in the presence of an acid-acceptor, for example, pyridine, or N,N-dimethylaniline, which serves to take up the hydrogen halide or lower-alkanoic acid which is formed during the course of the reaction.

In addition to the use as starting materials of 2-$R_4$-5,5 - dimethyl-10-hydroxy-8-alkyl-1,2,3,4-tetrahydro-5H-[1]benzopyrano[3,4-d]pyridines or 3 - $R_4$-5,5-dimethyl-10 - hydroxy - 8-alkyl-1,2,3,4-tetrahydro-5H-[1]benzopyrano[3,4-c]pyridines wherein $R_4$ is phenyl-lower-alkyl unsubstituted in the phenyl ring thereof, other benzopyrano[3,4-d]- and [3,4-c]pyridines substituted in the phenyl ring of the phenyl-lower-alkyl substituent, $R_4$, by one or more members of the group consisting of halogen (including fluorine, chlorine, bromine, and iodine), lower-alkyl, lower-alkoxy, lower-alkylmercapto, lower-alkylsulfinyl, lower-alkylsulfonyl, nitro, amino, lower-alkanoylamino, di-lower-alkylamino, trifluoromethyl, methylenedioxy, ethylenedioxy, lower-alkanoyloxy, and hydroxy can also be employed. In such instances, the same reaction conditions used in the previously described reactions can be used.

In standard serial dilution tests, for example as described by Bailey et al., J. Am. Pharm. Assn. (Sc. Ed.) 48, 212–16 (1959), the compounds of Formula I have been shown to have anti-bacterial and anti-fungal activity. The effective anti-bacterial and anti-fungal concentrations of the compounds of the invention can be determined by routine procedures, for example as described by Bailey et al. supra, without the need for detailed experimentation.

The compounds are formulated for use by preparing a dilute solution in an aqueous acidic medium or in a neutral solution containing a surfactant, or alternatively in an organic medium in which the compounds are soluble, for example ethyl alcohol, terpineol, and the like, and are applied to a surface to be disinfected, or which is susceptible to contamination, by conventional means such as spraying, swabbing, immersion, and the like. Alternatively the compounds can be formulated as ointments or creams by incorporating them in conventional ointment or cream bases, as alkylpolyether alcohols, cetyl alcohol, stearyl alcohol, and the like, or as jellies by incorporating them in conventional jelly bases as glycerin and tragacanth. They can also be formulated for use as aerosol sprays or foams.

The chemical structures of the compounds of the invention are established by the mode of synthesis and are corroborated by infrared, ultraviolet, and nuclear magnetic resonance spectra, and by the correspondence between calculated values and values found by chemical analysis.

The following examples will further illustrate specific embodiments of the invention without the latter being limited thereto.

EXAMPLE 1

2 - [1 - ( 2 - isopropyl-5-methyl-1-cyclohexenyl)]-5-(3 - methyl - 2-octyl)-resorcinol.—A solution of 2.0 g. (0.007 mole) of 1-hydroxy-3-(3-methyl-2-octyl) - 6,6,9-trimethyl-7,8,9,10-tetrahydro-6H-dibenzo[b,d]pyran dissolved in 125 ml. of tetrahydrofuran and 50 ml. of aniline was stirred with 200 ml. of refluxing liquid ammonia, and the solution was treated with 0.6 g. (0.1 g. atom) of lithium, added in small pieces. The solution was stirred for seven hours, and additional small amounts of lithium were added from time to time whenever the blue color of the reaction mixture faded. The ammonia was then evaporated, and the residue neutralized with ammonium chloride and extracted with ether. The combined ether extracts were washed with water, dried, and evaporated to dryness, giving a brown gum which was chromatographed over silicic acid in benzene. Evaporation of the first fraction gave 1.4 g. of 2-[1-(2-isopropyl-5-methyl-1-cyclohexenyl)]-5-(3-methyl-2-octyl)resorcinol as a reddish gum.

Analysis.—Calcd. for $C_{25}H_{40}O_2$ (percent): C, 80.59; H, 10.82. Found (percent): C, 80.63; H, 10.72.

EXAMPLE 2

2 - [1 - (2 - isopropyl-5-methyl-1-cyclohexenyl)]-5-(3-methyl-2-octyl)resorcinol diacetate.—A small amount of 2 - [1 - (2 - isopropyl-5-methyl-1-cyclohexenyl)]-5-(3-methyl-2-octyl)resorcinol was dissolved in 15 ml. of acetic anhydride, and the mixture was treated with 0.5 g. of fused sodium acetate and refluxed for three hours. The acetic anhydride was then removed by evaporation, and the residue dissolved in ether. The combined ether extracts were washed with aqueous sodium bicarbonate, dried, and evaporated to dryness giving a red oil, which was chromatographed in benzene over silicic acid to give 2 - [1 - (2 - isopropyl-5-methyl-1-cyclohexenyl)]-5-(3-methyl-2-octyl)resorcinol diacetate as a gum.

Analysis.—Calcd. for $C_{29}H_{44}O_4$ (percent): C, 76.27; H, 9.71. Found (percent): C, 75.72; H, 9.89.

EXAMPLE 3

2 - [1 - (2 - isopropyl - 5 - ethyl - 1 - cyclohexenyl)]-5-n-amylresorcinol is prepared by lithium amide reduction of 3-n-amyl-6,6-dimethyl-9-ethyl-1-hydroxy-7,8,9,10-tetrahydro-6H-dibenzo[b,d]pyran in tetrahydrofuran using the procedure described above in Example 1.

EXAMPLE 4

2 - [1 - (2 - isopropyl - 5 - methyl-1-cyclohexenyl)]-5-(2-heptyl)-resorcinol is prepared by lithium amide reduction of 6,6 - dimethyl-3-(2-heptyl)-1-hydroxy-9-methyl-7,8,9,10-tetrahydro-6H-dibenzo[b,d]pyran in tetrahydrofuran using the procedure described in Example 1.

EXAMPLE 5

2 - [1 - (2 - isopropyl-5-methyl-1-cyclohexenyl)]-5-(2-decyl)-resorcinol is prepared by lithium amide reduction of 3 - (2-decyl)-1-hydroxy-6,6,9-trimethyl-7,8,9,10-tetrahydro-6H-dibenzo[b,d]-pyran in tetrahydrofuran using the procedure described above in Example 1.

EXAMPLE 6

2 - [3 - (4-isopropyl-1,2,5,6-tetrahydropyridyl)]-5-(3-methyl - 2-octyl)resorcinol.—A solution of 3.5 g. (0.01 mole) of 5,5 - dimethyl-10-hydroxy-8-(3-methyl-2-octyl)-1,2,3,4 - tetrahydro-5H-[1]benzopyrano[3,4-d]pyridine in 125 ml. of dry tetrahydrofuran and 200 ml. of liquid ammonia was treated with 0.6 g. (0.1 g. atom) of lithium added in small pieces, and the deep blue solution was stirred for two hours in a Dry Ice bath. The bath was then removed, the ammonia allowed to evaporate, and the residue decomposed by the cautious addition of 6 g. of ammonium chloride followed by 100 ml. of water. The layers were separated, the aqueous layer extracted with ether, and the combined ether extracts were evaporated to dryness to give 3.3 g. of 2 - [3 - (4 - isopropyl-1,2,5,6-tetrahydropyridyl) - (3-methyl-2-octyl)resorcinol, M.P. 77–81° C. (uncorr.).

Analysis.—Calcd. for $C_{23}H_{37}NO_2$ (percent): C, 76.83; H, 10.37; N, 3.90. Found (percent): C, 76.89; H, 10.26; N, 3.83.

EXAMPLE 7

2 - [3 - (1 - benzyl-4-isopropyl-1,2,5,6-tetrahydropyridyl)] - 5 - (3-methyl-2-octyl)resorcinol is prepared by lithium amide reduction of 2-benzyl-5,5-dimethyl-10-hydroxy - 8 - (3 - methyl-2-octyl)-1,2,3,4-tetrahydro-5H[1] benzopyrano[3,4-d]pyridine in tetrahydrofuran using the procedure described above in Example 6.

Similarly, by lithium amide reduction in tetrahydrofuran of 2-(4-chlorobenzyl)-5,5-dimethyl-10-hydroxy-8-(3-methyl-2-octyl)-1,2,3,4-tetrahydro-5H-[1]benzopyrano [3,4-d]-pyridine;

2-(4-bromobenzyl)-5,5-dimethyl-10-hydroxy-8-(3-methyl-2-octyl)-1,2,3,4-tetrahydro-5H-[1]benzopyrano [3,4-d]-pyridine;

2-(3-methylbenzyl)-5,5-dimethyl-10-hydroxy-8-(3-methyl-2-octyl)-1,2,3,4-tetrahydro-5H-[1]benzopyrano[3,4-d]-pyridine;

2-(2-methoxybenzyl)-5,5-dimethyl-10-hydroxy-8-(3-methyl-2-octyl)-1,2,3,4-tetrahydro-5H-[1]benzopyrano [3,4-d]-pyridine;

2-(4-methylmercaptobenzyl)-5,5-dimethyl-10-hydroxy-8-(3-methyl-2-octyl)-1,2,3,4-tetrahydro-5H-[1] benzopyrano[3,4-d]-pyridine;

2-(4-methylsulfinylbenzyl)-5,5-dimethyl-10-hydroxy-8-(3-methyl-2-octyl)-1,2,3,4-tetrahydro-5H-[1] benzopyrano[3,4-d]-pyridine;

2-(4-methylsulfonylbenzyl)-5,5-dimethyl-10-hydroxy-8-(3-methyl-2-octyl)-1,2,3,4-tetrahydro-5H-[1] benzopyrano[3,4-d]-pyridine;

2-(3-nitrobenzyl)-5,5-dimethyl-10-hydroxy-8-(3-methyl-2-octyl)-1,2,3,4-tetrahydro-5H-[1]benzopyrano[3,4-d]pyridine; or 2-(3-aminobenzyl)-5,5-dimethyl-10-hydroxy-8-(3-methyl-2-octyl)-1,2,3,4-tetrahydro-5H-[1]benzopyrano[3,4-d] pyridine, there can be obtained, respectively, 2-{3-[1-(4-chlorobenzyl)-4-isopropyl-1,2,5,6-tetrahydropyridyl]}-5-(3-methyl-2-octyl)resorcinol;

2-{3-[1-(4-bromobenzyl)-4-isopropyl-1,2,5,6-tetrahydropyridyl]}-5-(3-methyl-2-octyl)resorcinol;

2-{3-[1-(3-methylbenzyl)-4-isopropyl-1,2,5,6-tetrahydropyridyl]}-5-(3-methyl-2-octyl)-resorcinol;

2-{3-[1-(2-methoxybenzyl)-4-isopropyl-1,2,5,6-tetrahydropyridyl]}-5-(3-methyl-2-octyl)resorcinol;

2-{3-[1-(4-methylmercaptobenzyl)-4-isopropyl-1,2,5,6-tetrahydropyridyl]}-5-(3-methyl-2-octyl)resorcinol;

2-{3-[1-(4-methylsulfinylbenzyl)-4-isopropyl-1,2,5,6-tetrahydropyridyl}-5-(3-methyl-2-octyl)-resorcinol;

2-{3-[1-(4-methylsulfonylbenzyl)-4-isopropyl-1,2,5,6-tetrahydropyridyl]}-5-(3-methyl-2-octyl)resorcinol;
2-{3-[1-(3-nitrobenzyl)-4-isopropyl-1,2,5,6-tetrahydropyridyl]}-5-(3-methyl-2-octyl)resorcinol; or
2-{3-[1-(3-aminobenzyl)-4-isopropyl-1,2,5,6-tetrahydropyridyl]}-5-(3-methyl-2-octyl)-resorcinol.

EXAMPLE 8

2 - [3 - (1-benzyl-4-isopropyl-1,2,5,6-tetrahydropyridyl)]-5-methylresorcinol is prepared by lithium amide reduction of 2 - benzyl-10-hydroxy-5,5,8-trimethyl-1,2,3,4-tetrahydro - 5H-[1]-benzopyrano[3,4-d]pyridine in tetrahydrofuran using the procedure described above in Example 6.

EXAMPLE 9

2 - {3 - [4-isopropyl-1-(2-phenylethyl)-1,2,5,6-tetrahydropyridyl]} - 5-(3-methyl-2-octyl)resorcinol is prepared by lithium amide reduction of 5,5-dimethyl-10-hydroxy-8 - (3 - methyl-2-octyl)-2-(2-phenylethyl)-1,2,3,4-tetrahydro - 5H - [1]benzopyrano[3,4-d]-pyridine in tetrahydrofuran using the procedure described above in Example 6.

Similarly, by lithium amide reduction in tetrahydrofuran of 5,5-dimethyl-10-hydroxy-8-(3-methyl-2-octyl)-2-[2-(3-acetylaminophenyl)ethyl]-1,2,3,4-tetrahydro-5H-[1]benzopyrano-[3,4-d]pyridine;
5,5-dimethyl-10-hydroxy-8)-3-methyl-2-octyl)-2-[2-(4-dimethylaminophenyl)ethyl]-1,2,3,4-tetrahydro-5H-[1]-benzopyrano[3,4-d]pyridine;
5,5-dimethyl-10-hydroxy-8-(3-methyl-2-octyl)-2-[2-(3-trifluoromethylphenyl)ethyl]-1,2,3,4-tetrahydro-5H-[1]benzopyrano[3,4-d]pyridine;
5,5-dimethyl-10-hydroxy-8-(3-methyl-2-octyl)-2-[2-(3,4-methylenedioxyphenyl)ethyl]-1,2,3,4-tetrahydro-5H-[1]benzopyrano[3,4-d]pyridine;
5,5-dimethyl-10-hydroxy-8-(3-methyl-2-octyl)-2-[2-(3,4-ethylenedioxyphenyl)ethyl]-1,2,3,4-tetrahydro-5H-[1]benzopyrano[3,4-d]pyridine;
5,5-dimethyl-10-hydroxy-8-(3-methyl-2-octyl)-2-[2-(3-acetoxyphenyl)ethyl]-1,2,3,4-tetrahydro-5H-[1]benzopyrano[3,4-d]pyridine; or
5,5-dimethyl-10-hydroxy-8-(3-methyl-2-octyl)-2-(3-hydroxyphenyl)-ethyl]-1,2,3,4-tetrahydro-5H-[1]benzopyrano[3,4-d]pyridine, there can be obtained, respectively, 2-<3-{4-isopropyl-1-[2-(3-acetylaminophenyl)ethyl]-1,2,5,6-tetrahydropyridyl}>-5-(3-methyl-2-octyl)resorcinol;
2-<3-{4-isopropyl-1-[2-(4-dimethylaminophenyl)ethyl]-1,2,5,6-tetrahydropyridyl}>-5-(3-methyl-2-octyl)resorcinol;
2-<3-{4-isopropyl-1-[2-(3-trifluoromethylphenyl)ethyl]1,2,5,6-tetrahydropyridyl}>-5-(3-methyl-2-octyl)resorcinol;
2-<3{4-isopropyl-1-[2-(3,4-methylenedioxyphenyl)ethyl]1,2,5,6-tetrahydropyridyl}>-5-(3-methyl-2-octyl)resorcinol;
2-<3-{4-isopropyl1-[2-(3,4-ethylenedioxyphenyl)ethyl-1,2,5,6-tetrahydropyridyl}>-5-(3-methyl-2-octyl)resorcinol;
2-<3-{4-isopropyl-1-[2-(3-acetoxy-phenyl)ethyl]-1,2,5,6-tetrahydropyridyl}>-5-(3-methyl-2-octyl)resorcinol; or
2-<3-{4-isopropyl-1-[2-(3-hydroxyphenyl)ethyl]-1,2,5,6-tetrahydropyridyl}>-5-(3-methyl-2-octyl)resorcinol.

EXAMPLE 10

2-[3-(4-isopropyl-1-methyl-1,2,5,6-tetrahydropyridyl)]-5-(n-amyl)resorcinol is prepared by lithium amide reduction of 8-(n-amyl)-2,5,5-trimethyl-10-hydroxy-1,2,3,4-tetrahydro-5H-[1]benzopyrano[3,4-d]pyridine in tetrahydrofuran using the procedure described above in Example 6.

EXAMPLE 11

2-[3-(4-isopropyl-1-methyl-1,2,5,6-tetrahydropyridyl)]-5-(n-amyl)resorcinol diacetate is prepared by reacting 2-[3-(4-isopropyl - 1 - methyl-1,2,5,6-tetrahydropyridyl)]-5-(n-amyl)resorcinol with acetic anhydride in the presence of sodium acetate using the procedure described above in Example 2.

EXAMPLE 12

2-[4-(1-benzyl-3-isopropyl-1,2,5,6-tetrahydropyridyl)]-5-methylresorcinol.—Lithium (0.41 g., 0.06 mole) was added in small portions to a well stirred solution of 1 g. (0.003 mole) of 3-benzyl-5,5,8-trimethyl-10-hydroxy-1,2,3,4 - tetrahydro-5H-[1]benzopyrano[3,4-c]pyridine in 50 ml. of dry tetrahydrofuran and 50 ml. of liquid ammonia. The mixture was stirred for four hours at Dry Ice temperature, and the ammonia was then allowed to evaporate. The residue was decomposed with 3.2 g. (0.06 mole) of ammonium chloride followed by 100 ml. of water. The layers were separated, the aqueous phase was extracted with two 100 ml. portions of ether, and the combined extracts were dried over anhydrous sodium sulfate and evaporated to dryness. Recrystallization of the residual material from acetonitrile gave 0.49 g. of 2-[4-(1-benzyl - 3 - isopropyl - 1,2,5,6 - tetrahydropyridyl)]-5-methylresorcinol, M.P. 205–208° C. (uncorr.).

*Analysis.*—Calcd. for $C_{22}H_{27}NO_2$ (percent): C, 78.30; H, 8.07; N, 4.15. Found (percent): C, 78.83; H, 8.14; N, 4.07.

Similarly, by lithium amide reduction in tetrahydrofuran of 3-(4-chlorobenzyl)-5,5,8-trimethyl-10-hydroxy-1,2,3,4-tetrahydro-5H-[1]benzopyrano[3,4-c]pyridine;
3-(4-bromobenzyl)-5,5,8-trimethyl-10-hydroxy-1,2,3,4-tetrahydro-5H-[1]benzopyrano[3,4-c]pyridine;
3-(3-methylbenzyl)-5,58-trimethyl-10-hydroxy-1,2,3,4-tetrahydro-5H-[1]benzopyrano[3,4-c]pyridine;
3-(2-methoxybenzyl)-5,5,8-trimethyl-10-hydroxy-1,2,3,4-tetrahydro-5H-[1]benzopyrano[3,4-c]pyridine;
3-(4-methylmercaptobenzyl)-5,5,8-trimethyl-10-hydroxy-1,2,3,4-tetrahydro-5H-[1]benzopyrano[3,4-c]pyridine;
3-(4-methylsulfinylbenzyl)-5,5,8-trimethyl-10-hydroxy-1,2,3,4-tetrahydro-5H-[1]benzopyrano[3,4-c]pyridine;
3-(4-methylsulfonylbenzyl)-5,5,8-trimethyl-10-hydroxy-1,2,3,4-tetrahydro-5H-[1]benzopyrano[3,4-c]pyridine;
3-(3-nitrobenzyl)-5,5,8-trimethyl-10-hydroxy-1,2,3,4-tetrahydro-5H-[1]benzopyrano[3,4-c]pyridine;
3-(3-aminobenzyl)-5,5,8-trimethyl-10-hydroxy-1,2,3,4-tetrahydro-5H-[1]benzopyrano[3,4-c]pyridine;
3-(3-acetylaminobenzyl)-5,5,8-trimethyl-10-hydroxy-1,2,3,4-tetrahydro-5H-[1]benzopyrano[3,4-c]pyridine;
3-(4-dimethylaminobenzyl)-5,5,8-trimethyl-10-hydroxy-1,2,3,4-tetrahydro-5H-[1]benzopyrano[3,4-c]pyridine;
3-(3-trifluoromethylbenzyl)-5,5,8-trimethyl-10-hydroxy-1,2,3,4-tetrahydro-5H-[1]benzopyrano[3,4-c]pyridine;
3-(3,4-methylenedioxybenzyl)-5,5,8-trimethyl-10-hydroxy-1,2,3,4-tetrahydro-5H-[1]benzopyrano-[3,4-c]pyridine;
3-(3,4-ethylenedioxybenzyl)-5,5,8-trimethyl-10-hydroxy-1,2,3,4-tetrahydro-5H-[1]benzopyrano[3,4-c]pyridine;
3-(3-acetoxybenzyl)-5,5,8-trimethyl-10-hydroxy-1,2,3,4-tetrahydro-5H-[1]benzopyrano[3,4-c]pyridine; or
3-(3-hydroxybenzyl)-5,5,8-trimethyl-10-hydroxy-1,2,3,4-tetrahydro-5H-[1]benzopyrano[3,4-c]pyridine, there can be obtained respectively, 2-{4-[1-(4-chlorobenzyl)-3-isopropyl-1,2,5,6-tetrahydropyridyl]}-5-methylresorcinol;
2-{4-[1-(4-bromobenzyl)-3-isopropyl-1,2,5,6-tetrahydropyridyl]}-5-methylresorcinol;
2-{4-[1-(3-methylbenzyl)-3-isopropyl-1,2,5,6-tetrahydropyridyl]}-5-methylresorcinol;
2-{4-[1-(2-methoxybenzyl)-3-isopropyl-1,2,5,6-tetrahydropyridyl]}-5-methylresorcinol;

2-{4-[1-(4-methylmercaptobenzyl)-3-isopropyl-1,2,5,6-tetrahydropyridyl]}-5-methylresorcinol;
2-{4-[1-(4-methylsulfinylbenzyl)-3-isopropyl-1,2,5,6-tetrahydropyridyl]}-5-methylresorcinol;
2-{4-[1-(4-methylsulfonylbenzyl)-3-isopropyl-1,2,5,6-tetrahydropyridyl]}-5-methylresorcinol;
2-{4-[1-(3-nitrobenzyl)-3-isopropyl-1,2,5,6-tetrahydropyridyl]}-5-methylresorcinol;
2-{4-[1-(3-aminobenzyl)-3-isopropyl-1,2,5,6-tetrahydropyridyl]}-5-methylresorcinol;
2-{4-[1-(3-acetylaminobenzyl)-3-isopropyl-1,2,5,6-tetrahydropyridyl]}-5-methylresorcinol;
2-{4-[1-(4-dimethylaminobenzyl)-3-isopropyl-1,2,5,6-tetrahydropyridyl]}-5-methylresorcinol;
2-{4-[1-(3-trifluoromethyl)-3-isopropyl-1,2,5,6-tetrahydropyridyl]}-5-methylresorcinol;
2-{4-[1-(3,4-methylenedioxybenzyl)-3-isopropyl-1,2,5,6-tetrahydropyridyl]}-5-methylresorcinol;
2-{4-[1-(3,4-ethylenedioxybenzyl)-3-isopropyl-1,2,5,6-tetrahydropyridyl]}-5-methylresorcinol;
2-{4-[1-(3-acetoxybenzyl)-3-isopropyl-1,2,5,6-tetrahydropyridyl]}-5-methylresorcinol; or
2-{4-[1-(3-hydroxybenzyl)-3-isopropyl-1,2,5,6-tetrahydropyridyl]}-5-methylresorcinol.

EXAMPLE 13

2-[4-(3-isopropyl-1-methyl-1,2,5,6-tetrahydropyridyl)]-5-(3-methyl-2-octyl)resorcinol is prepared by lithium amide reduction of 10-hydroxy-8-(3-methyl-2-octyl)-5,5,8-trimethyl-1,2,3,4-tetrahydro-5H-[1]benzopyrano[3,4-c]pyridine in tetrahydrofuran using the procedure described above in Example 12.

EXAMPLE 14

2-[4-(3-isopropyl-1,2,5,6-tetrahydropyridyl)]-5-(3-methyl-2-octyl)resorcinol is prepared by lithium amide reduction of 5,5-dimethyl-10-hydroxy-8-(3-methyl-2-octyl)-1,2,3,4-tetrahydro-5H-[1]benzopyrano[3,4-c]pyridine using the procedure described above in Example 12.

EXAMPLE 15

2-{4-[3-isopropyl-1-(2-phenylethyl)-1,2,5,6-tetrahydropyridyl]}-5-(3-methyl-2-octyl)resorcinol is prepared by lithium amide reduction of 5,5-dimethyl-10-hydroxy-8-(3-methyl-2-octyl)-3-(2-phenylethyl)-1,2,3,4-tetrahydro-5H[1]benzopyrano[3,4-c]pyridine in tetrahydrofuran using the procedure described above in Example 12.

EXAMPLE 16

2-[3-(2-isopropyl-1,4-ethano-1,4,5,6-tetrahydropyridyl)]-5-(3-methyl-2-octyl)resorcinol hydrochloride.—Lithium (0.24 g., 0.35 g. atom) was added in portions to a solution of 1.02 g. of 5,5-dimethyl-1,4-ethano-10-hydroxy-8-(3-methyl-2-octyl)-1,2,3,4-tetrahydro-5H-[1]benzopyrano[3,4-b]-pyridine hydriodide in 50 ml. of dry tetrahydrofuran and 100 ml. of liquid ammonia. The mixture was stirred for three and a half hours at Dry Ice temperature, and the ammonia was then allowed to evaporate. Decomposition of the residue with 3 g. (0.05 mole) of ammonium chloride followed by 120 ml. of water, separation of the organic and aqueous layers, extraction of the aqueous layer with ether, and drying and evaporation to dryness of the combined organic extracts afforded a dark gummy residue. The latter was dissolved in hot acetonitrile, the solution was cooled, filtered, and evaporated to dryness, and the residue was dissolved in ether and treated with anhydrous hydrogen chloride. The solution was diluted threefold with petroleum ether, and the solid which separated was collected and recrystallized from acetonitrile to give 152 mg. of 2-[3-(2-isopropyl-1,4-ethano-1,4,5,6-tetrahydropyridyl)]-5-(3-methyl-2-octyl)resorcinol hydrochloride, M.P. 236–238° C.

Analysis.—Calcd. for $C_{25}H_{39}NO_2 \cdot HCl$ (percent): C, 71.15; H, 9.55; N, 3.32. Found (percent): C, 70.88; H, 9.27; N, 3.31.

EXAMPLE 17

2-[3-(2-isopropyl-1,4-ethano-1,4,5,6-tetrahydropyridyl)]-3-methylresorcinol is prepared by lithium amide reduction of 1,4-ethano-10-hydroxy-5,5,8-trimethyl-1,2,3,4-tetrahydro-5H-[1]benzopyrano[3,4-b]pyridine in tetrahydrofuran using the procedure described above in Example 16.

EXAMPLE 18

2-[4-(3-isopropyl-1-methyl-1,2,5,6-tetrahydropridyl)]-5-(3-methyl-2-octyl)resorcinal dipropionate is prepared by reacting 2-[4-(3-isopropyl-1-methyl-1,2,5,6-tetrahydropyridyl)]-5-(3-methyl-2-octyl)resorcinol with propionic anhydride in the presence of sodium propionate using the procedure described above in Example 2.

EXAMPLE 19

2-[3-(2-isopropyl-1,4-ethano-1,4,5,6-tetrahydropyridyl)]-5-(3-methyl-2-octyl)resorcinol dibutyrate is prepared by reaction of 2-[3-(2-isopropyl-1,4-ethano-1,4,5,6-tetrahydropyridyl)]-5-(3-methyl-2-octyl)resorcinol with butyric anhydride in the presence of sodium butyrate using the procedure described above in Example 2.

In standard serial dilution tests, the compounds of the invention have been found to be antibacterially effective at concentrations of 2.5 to 100 mcg./ml. against such bacterial organisms as *Staphylococcus aureus, Escherichia coli, Proteus vulgaris,* and *Pseudomonas aeruginosa* and to be antifungally effective at concentrations of 10 to 100 mcg./ml. against such fungal organisms as *Candida albicans, Aspergillus niger,* and *Trichophyton mentagrophytes.*

We claim:
1. A compound having the formula

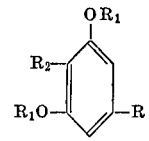

wherein

R is: alkyl containing from one to ten carbon atoms;
$R_1$ is: hydrogen or lower-alkanoyl; and
$R_2$ is: 3-(1-$R_4$-4-isopropyl-1,2,5,6-tetrahydropyridyl), or 4-(1-$R_4$-3-isopropyl-1,2,5,6-tetrahydropyridyl) in which $R_4$ is: hydrogen or phenyl-lower-alkyl.

2. A compound according to claim 1 wherein $R_2$ is 3-(1-$R_4$-4-isopropyl-1,2,5,6-tetrahydropyridyl) in which $R_4$ is hydrogen.

3. A compound according to claim 1 wherein $R_2$ is 4-(1-$R_4$-3-isopropyl-1,2,5,6-tetrahydropyridyl) in which $R_4$ is phenyl-lower-alkyl.

4. A compound according to claim 2 wherein $R_1$ is hydrogen.

5. A compound according to claim 3 wherein $R_1$ is hydrogen.

References Cited

UNITED STATES PATENTS

| | | | |
|---|---|---|---|
| 2,748,140 | 5/1956 | Schmidle et al. | 260—297 R |
| 2,967,182 | 1/1961 | Pohland | 260—297 R |
| 3,458,521 | 7/1969 | Jack et al. | 260—297 R |
| 3,523,950 | 8/1970 | Helsley | 260—297 R |

HENRY R. JILES, Primary Examiner

S. D. WINTERS, Assistant Examiner

U.S. Cl. X.R.

260—625, 621 R, 479 R, 295 R, 293.53, 345.3, 297 T, 343.2, 295 T, 468 R, 293.88; 424—267, 263, 346, 311